US010629394B2

(12) United States Patent
Liang et al.

(10) Patent No.: US 10,629,394 B2
(45) Date of Patent: Apr. 21, 2020

(54) KEYSWITCH ASSEMBLY AND KEYBOARD

(71) Applicants:LITE-ON Technology (Chang Zhou) Co., LTD., Jiangsu Province (CN); LITE-ON Technology Corporation, Taipei (TW)

(72) Inventors: Xiao Qiang Liang, Jiangsu Province (CN); Bing Wei Zhang, Jiangsu Province (CN); Chia-Shiun Wu, Jiangsu Province (CN); Xiang Zhao, Jiangsu Province (CN)

(73) Assignees: LITE-ON TECHNOLOGY (CHANG ZHOU) CO., LTD, Jiangsu Province (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/141,073

(22) Filed: Sep. 25, 2018

(65) Prior Publication Data

US 2019/0318890 A1 Oct. 17, 2019

(30) Foreign Application Priority Data

Apr. 11, 2018 (CN) .......................... 2018 1 0320109

(51) Int. Cl.
*H01H 13/83* (2006.01)
*F21V 8/00* (2006.01)
*G06F 3/02* (2006.01)

(52) U.S. Cl.
CPC ............. *H01H 13/83* (2013.01); *G02B 6/003* (2013.01); *G02B 6/0016* (2013.01); *G02B 6/0025* (2013.01); *G02B 6/0031* (2013.01); *G06F 3/0202* (2013.01)

(58) Field of Classification Search
CPC ............ H01H 13/83; H01H 2219/062; H01H 2219/044; H01H 2219/056; H01H 2219/06; H01H 2221/07; H01H 2209/074; H01H 13/023; H01H 2219/014; H01H 2009/187; H01H 2219/036; H01H 2219/0622
See application file for complete search history.

(56) References Cited

U.S. PATENT DOCUMENTS

| 2006/0108210 | A1* | 5/2006 | Katayama | H01H 13/023 200/296 |
| 2010/0288615 | A1* | 11/2010 | Mafune | H01H 13/83 200/5 A |
| 2011/0284354 | A1* | 11/2011 | Kato | H01H 13/7006 200/406 |
| 2016/0049266 | A1* | 2/2016 | Stringer | H01H 13/704 200/5 A |

* cited by examiner

*Primary Examiner* — Ahmed M Saeed
(74) *Attorney, Agent, or Firm* — Umberg Zipser LLP (57) ABSTRACT

A keyswitch assembly is provided. The keyswitch assembly includes a keyswitch module having a key cap, a light guiding member disposed above an outer surface of the key cap and a light source module disposed corresponding to the light guiding member. The light guiding member has a first surface adjacent to the key cap and a second surface facing away from the key cap and opposite the first surface. The light source module provides a light beam incident to the light guiding member. In the invention, the illumination effect of the keyswitch assembly is improved and the power consumption of the keyswitch assembly is reduced by way of disposing the light guiding member of the keyswitch assembly above the outer surface of the key cap.

13 Claims, 8 Drawing Sheets

KEYSWITCH ASSEMBLY AND KEYBOARD

CROSS REFERENCE TO RELATED APPLICATION

This application claims the priority benefit of Chinese Patent Application Serial Number 201810320109.1, filed on Apr. 11, 2018, the full disclosure of which is incorporated herein by reference.

BACKGROUND

Technical Field

This present invention generally relates to the field of keyswitch and, more particularly, to a keyswitch assembly and a keyboard.

Related Art

The light-emitting modules of the existing keyswitches or keyboards are mostly disposed under the bottom plate configured at the bottom of the keyswitches. Such configuration would hinder the illumination effect from the bottom plate and other structures. Even if the light-emitting module is disposed above the bottom plate, the illumination effect is also hindered by the other key structures. In order to lower the impact arisen from the bottom plate or other structure for the illumination effect, additional structures are required for the light-emitting modules therefore or increase of the power of the illuminating device is required. However, this would result in an additional burden on manufacturing costs as well as on the power consumption of the device.

SUMMARY

The embodiments of the present invention provides a keyswitch assembly and a keyboard adapted to a terminal device to lower the impact for the illumination effect arising from disposing the light-emitting module under the bottom plate.

In one embodiment of the invention, a keyswitch assembly is provided. The keyswitch comprises a keyswitch module having a key cap, a light guiding member disposed above an outer surface of the key cap and a light source module disposed corresponding to the light guiding member. The light guiding member has a first surface adjacent to the key cap and a second surface facing away from the key cap and opposite the first surface. The light source module provides a light beam incident to the light guiding member.

In another embodiment of the invention, a keyboard is provided. The keyboard comprises a plurality of keyswitch modules, each having a key cap, a light guiding member disposed above an outer surface of the key cap, a light source module disposed corresponding to the light guiding member. The light source module provides a light beam incident to the light guiding member.

In the embodiment of the present invention, the light guiding member further comprises a plurality of light diffusing structures configured on the first surface of the light guiding member, and the light diffusing structure scatters the light beam provided by the light source module.

In the embodiment of the present invention, the light diffusing structure is a texturing structure, a V-shaped groove structure or a microlens structure.

In the embodiment of the present invention, the light shielding sheet is a reflective sheet.

In the embodiment of the present invention, the keyswitch assembly further comprises a character sheet disposed on the second surface of the light guiding member, and the character sheet comprising a character corresponding to the key cap.

In the embodiment of the present invention, the character sheet comprises a light shielding region and a light transmission region having a shape corresponding to the shape of the character.

In the embodiment of the present invention, the light transmission region comprises a plurality of holes.

In the embodiment of the present invention, the keyswitch assembly further comprises a character sheet disposed above the outer surface of the key cap, the character sheet comprising a character.

In the embodiment of the present invention, the keyswitch module comprises:
 a bottom plate;
 a film circuit board disposed on the bottom plate;
 a lifting assembly disposed on the bottom plate and corresponding to the film circuit board; and
 an elastic member disposed in the lifting assembly and corresponds to the film circuit board;
wherein the key cap is disposed on the lifting assembly.

According to the embodiments of the present invention, the illumination effect of the keyswitch assembly and/or the keyword is improved by way of disposing the light guiding member of the keyswitch assembly and/or the keyword above the outer surface of the key cap. The embodiments of the present invention may also reduce the power consumption of the keyswitch assembly and/or the keyword.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect. Additionally the term "couple" or "connect" covers any direct or indirect electrically coupling means. Therefore when one device is electrically connected to another device in the context, that connection may be through a direct electrical connection, or through an indirect electrical connection via other devices and connections. The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals is used to refer to the same or similar elements throughout the invention.

Figure 1:
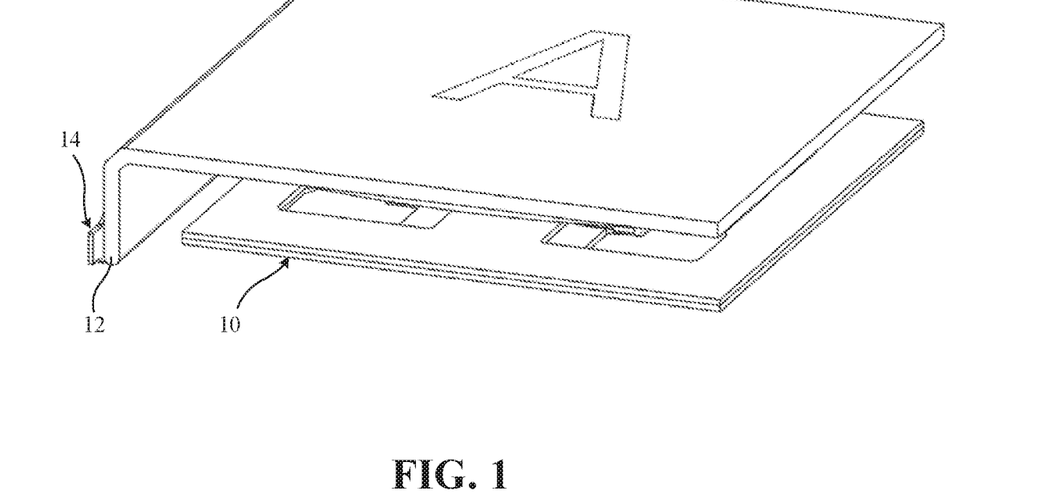
FIG. 1 shows the perspective view of the keyswitch assembly according to a first embodiment of the present invention.

FIG. 1 shows the perspective view of the keyswitch assembly according to a first embodiment of the present invention. As shown in the figure, the keyswitch assembly of the first embodiment of the present invention is adapted to an illuminating keyboard (not shown). The keyswitch assembly comprises a keyswitch module 10, a light guiding member 12, and a light source module 14. The keyswitch module 10 has a key cap. The light guiding member 12 is disposed above the key cap. The light source module 14 is disposed at one side of the light guiding member 12. The light source module 14 provides light beams to the light guiding member 12. The light beams come out from the key cap. The detailed structures of the keyswitch module 10, the guiding member 12, and the light source module 14 are described in detail below.

Figure 2:
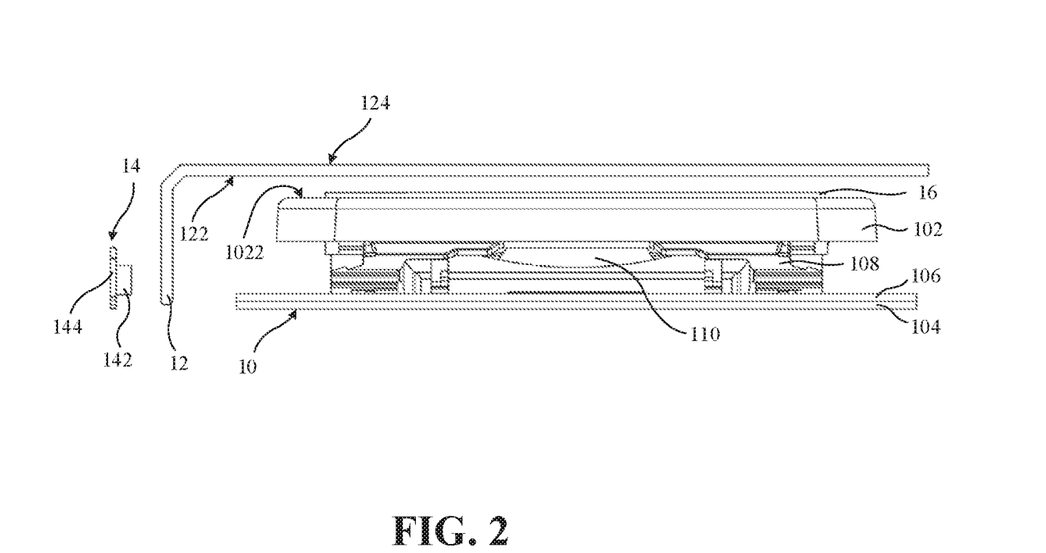
FIG. 2 shows the partial exploded view of the keyswitch assembly according to a first embodiment of the present invention.

FIG. 2 shows the partial exploded view of the keyswitch assembly according to a first embodiment of the present invention. As shown in the figure, the keyswitch module 10 comprises a key cap 102, a bottom plate 104, a film circuit board 106, a lifting assembly 108, and an elastic member 110. The film circuit board 106 is disposed on the bottom plate 104. The lifting assembly 108 is disposed on the bottom plate 104 and corresponds to the film circuit board 106. The elastic member 110 is disposed in the lifting assembly 108 and corresponds to the film circuit board 106. The key cap is disposed on the lifting assembly 108.

In the embodiment, the lifting assembly 108 may be, but not limited to, a rotary connection structure of a bridge or scissor type. A plurality of keyswitch switches (not shown) is disposed on the film circuit board 106. When the keyswitch switch is triggered by the elastic member 110, the keyswitch switch may generate a corresponding character or a functioning signal. The elastic member 110 may be, but not limited to, a rubber gasket or an elastic metal coil.

Please refer to FIG. 2 continuously. The light guiding member 12 is disposed above the outer surface 1022 of the key cap 102. The light guiding member 12 has a first surface 122 and a second surface 124. The first surface 122 is adjacent to the key cap 102. The second surface 124 faces away from the key cap 102 and is opposite the first surface 122. The light source module 14 is disposed corresponding to the light guiding member 12. The light source module 14 provides a light beam incident to the light guiding member 12. The light guiding member 12 refracts and diffuses the light beam provided by the light source module 14. Therefore, the light beam provided by light source module 14 may pass through the light guiding member 12, and then emit from the first surface 122 and/or the second surface 124 of the light guiding member 12. The light guiding member 12 illuminates above the key cap. The light source module 14 further comprises a plurality of light emitting devices 142 and a flexible circuit board 144. The plurality of light emitting devices 142 is electrically connected to the flexible circuit board 144. The light emitting devices 142 may be light emitting diodes. In this embodiment, the light source module 14 may be an individual module. Alternatively, the light source module 14 may be integrated on the film circuit board 106.

Figure 3:
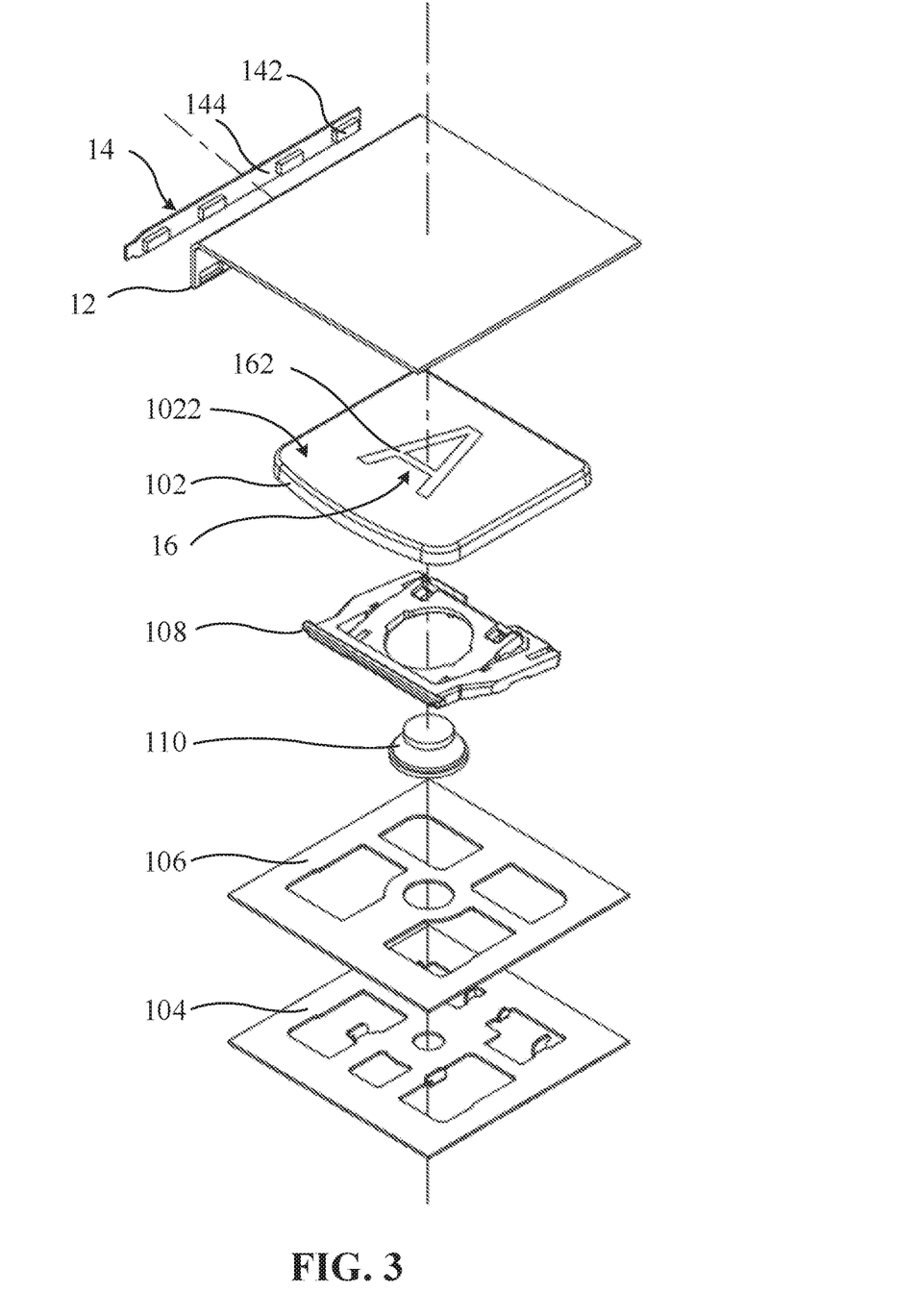
FIG. 3 shows the exploded view of the keyswitch assembly according to a first embodiment of the present invention.

FIG. 3 shows the exploded view of the keyswitch assembly according to a first embodiment of the present invention. As shown in the figure, in the first embodiment, the keyswitch assembly further comprises a character sheet 16. The character sheet 16 is disposed on the outer surface 1022 of the key cap 102. A character is formed on the character sheet 16. The character sheet 16 may be disposed on the outer surface 1022 of the key cap 102 by way of printing, transferring printing or laser printing. The character 162 may be an English character, a number, a symbol, or the like. In the first embodiment, the character sheet 16 may be disposed on the outer surface 1022 of the key cap 102. The light guiding member 12 is also disposed above the outer surface 1022 of the key cap 102. The light guiding member 12 itself is transparent. When the external light source is sufficient, the character 162 on the character sheet 16 disposed above the key cap 102 may be directly seen through the light guiding member 12. In addition, when the external source is insufficient or there is need for use, the character 162 is illuminated by the light beam provides by the light source module 14. The light source module 14 provides a light beam to the light guiding member 12, and the light guiding member 12 directs the light beam from the first surface 122 to emit and illuminate the character 162 on the character sheet 16 disposed above the key cap 102. The light source module 14 may provide the light beams required for illuminating the character 162.

In the embodiments of the present invention, the light guiding member provided in the keyswitch assembly may facilitate illuminating the character for users, which brings a new experience for the users to operate the keyswitch assembly.

The embodiments of the present invention solve the defect that the affection on the light-emitting effect arising from the light-emitting module of the existing keyswitch assembly blocked by the keyswitch structure.

In addition, the light guiding member disposed above the outer surface of the key cap may achieve uniform illumination on the characters. Since it is not blocked by the body of the keyswitch structure, fewer light-emitting devices are required in the embodiments of the present invention, effectively saving power consumption of the keyswitch assembly.

Figure 4:
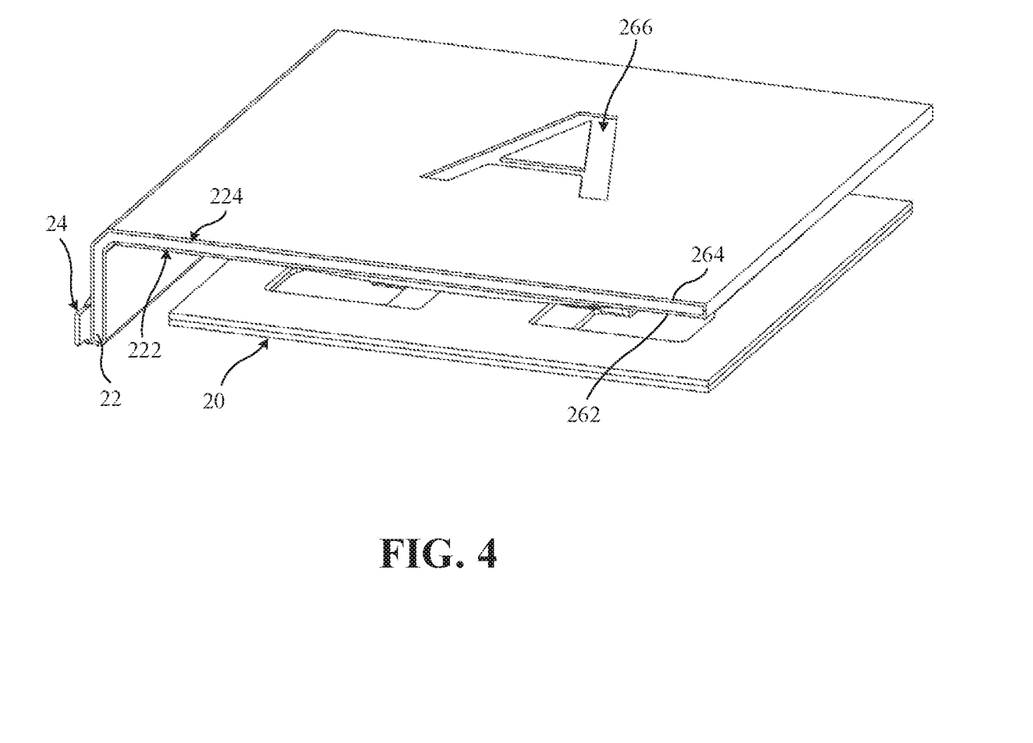
FIG. 4 shows the perspective view of the keyswitch assembly according to a second embodiment of the present invention.
Figure 5:
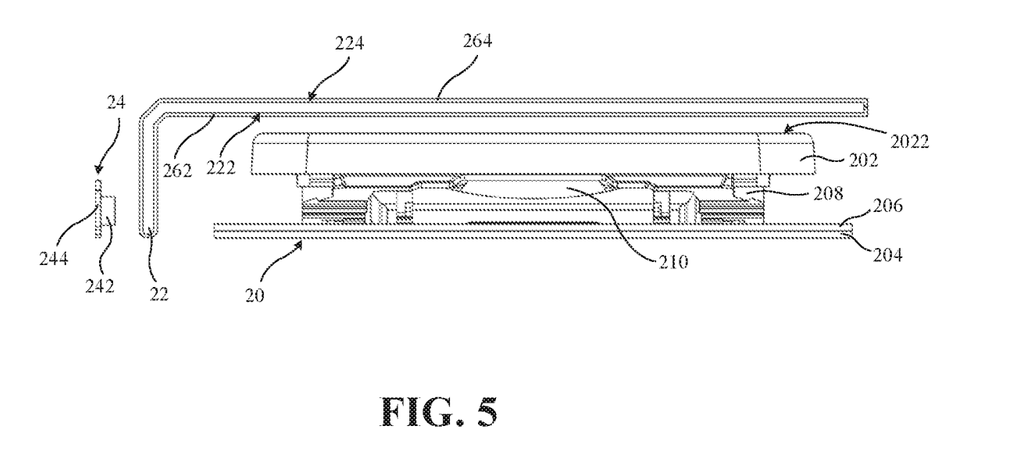
FIG. 5 shows the partial exploded view of the keyswitch assembly according to a second embodiment of the present invention.
Figure 6:
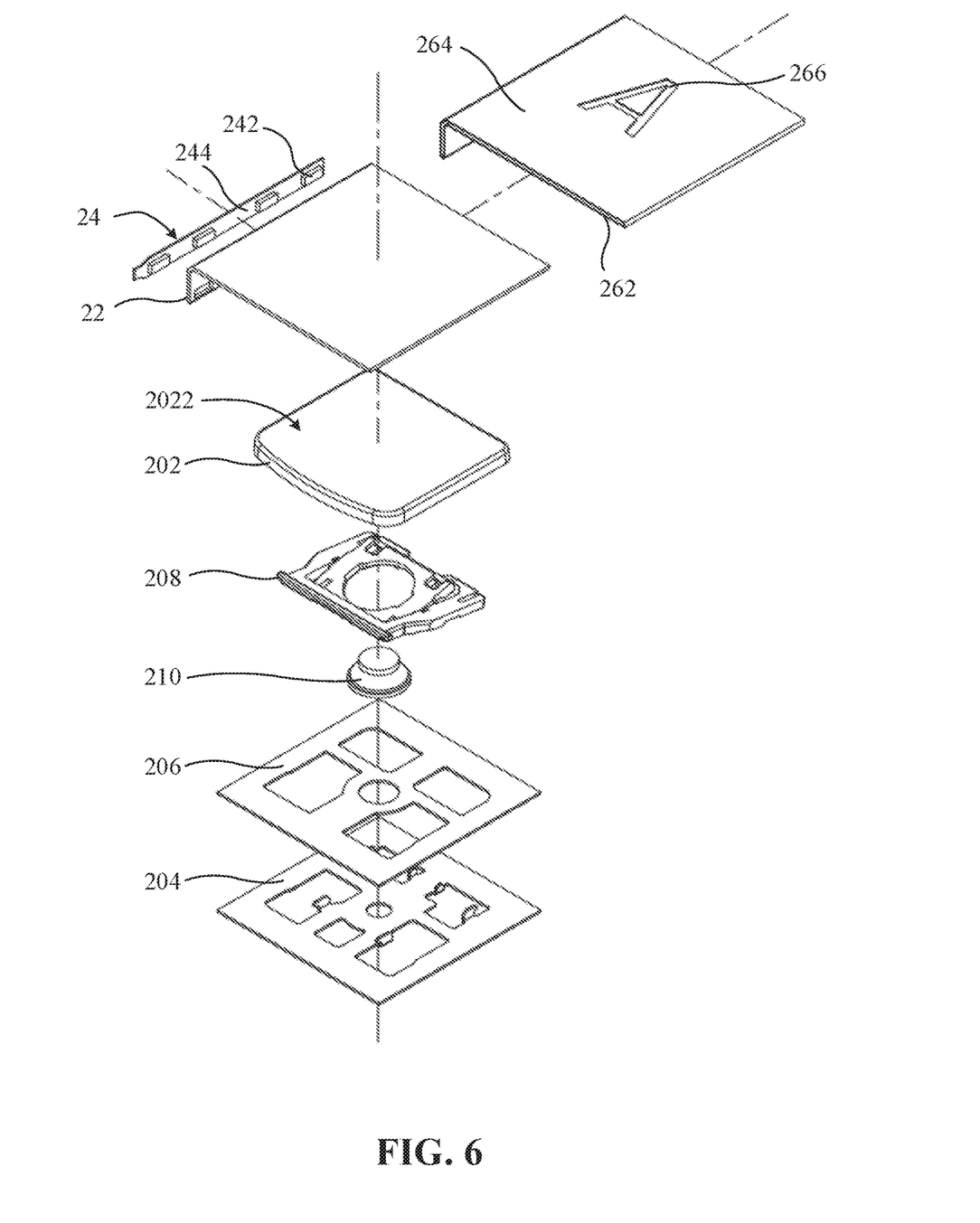
FIG. 6 shows the exploded view of the keyswitch assembly according to a second embodiment of the present invention.

FIG. 4 shows the perspective view of the keyswitch assembly according to a second embodiment of the present invention. FIG. 5 shows the partial exploded view of the keyswitch assembly according to a second embodiment of the present invention. FIG. 6 shows the exploded view of the keyswitch assembly according to a second embodiment of the present invention. As shown from FIG. 4 to 6, the keyswitch assembly of the second embodiment of the present invention comprises a keyswitch module 20, a light guiding member 22, a light source module 24, a light shielding sheet 262 and a character sheet 264.

The keyswitch module 20 comprises a key cap 202, a bottom plate 204, a film circuit board 206, a lifting assembly 208 and an elastic member 210. The light source module 24 comprises a plurality of light emitting devices 242 and a flexible circuit board 244. The keyswitch module 20 in the second embodiment is similar to that of the first embodiment. The difference between the keyswitch module 20 in the second embodiment is similar to that of the first embodiment lies in that the character sheet 264 is disposed on the surface of the light guiding member 22 facing away from the key cap 202, rather than being disposed on the outer surface 2022 of the key cap 202 of the keyswitch module 20. Beside these differences, the other configuration of the keyswitch module 20 of the second embodiment is the same as that of the first embodiment, description of which is not repeated hereinafter. The detailed structure of the light guiding member 22, the light shielding sheet 262, and the character sheet 264 is described in detail below.

Please continuously refer to FIG. 5 and FIG. 6. The light shielding sheet 262 is disposed on the first surface 222 of the light guiding member 22. The light shielding sheet 262 may shield the light beam emitted from the first surface 222 of the light guide 22. The light shielding sheet 262 may be a reflective sheet, for example a reflective sheet coated with a metal film. The reflective sheet may reflect the light beam emitted from the first surface 222 of the light guiding member 22 such that the light beam may enter to the light guiding member 22 again for refraction and diffusion without being absorbed or loss. The character sheet 264 is disposed on the second surface 224 of the light guiding member 22 and opposite to the light shielding sheet 262. A character 266 is formed on the character sheet 264, and the character 266 corresponds to the key cap 202. Since the character 266 corresponds to the key cap 202, when the user presses or clicks the keyswitch assembly according to the character 266, the key cap 202 may be directly pressed.

Figure 7:
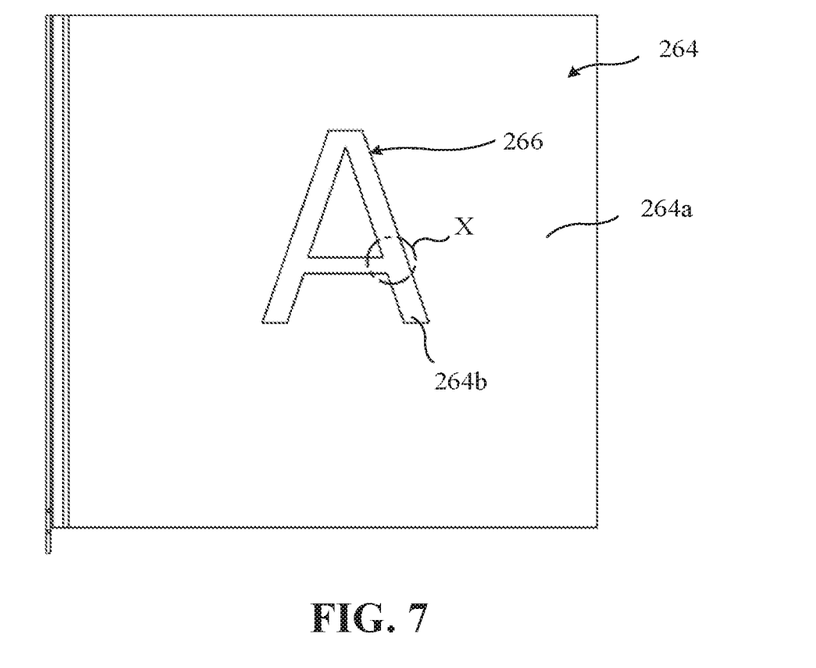
FIG. 7 shows the top view of the keyswitch assembly according to a second embodiment of the present invention.
Figure 8:
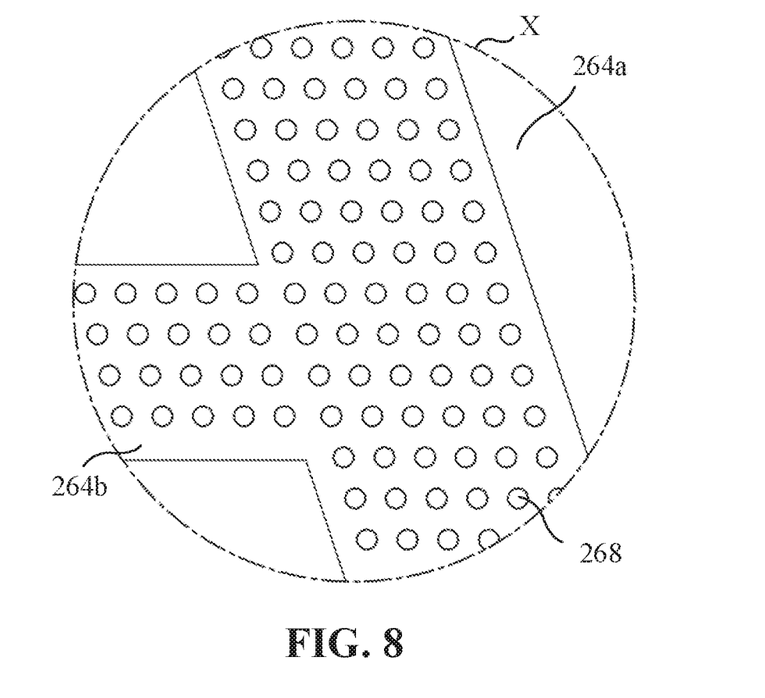
FIG. 8 shows the partial enlarged view of the keyswitch assembly according to a second embodiment of the present invention.

FIG. 7 shows the top view of the keyswitch assembly according to a second embodiment of the present invention. FIG. 8 shows the partial enlarged view of the keyswitch assembly according to a second embodiment of the present invention. As shown in FIG. 7 and FIG. 8, the character sheet 264 comprises a light shielding region 264a and a light transmission region 264b. The shape of light transmission region 264b corresponds to the shape of the character 266. In the second embodiment, since the character sheet 264 is disposed on the second surface 224 of the light guiding member 22, when the light source module 24 provides the light beam to the light guiding member 22, the light beam of the light source module 24 may pass through the light transmission region 264b of the character sheet 264 such that the character 266 may be presented on the character sheet 264. The character sheet 264 may be formed by way of printing. The light transmissive region 264b is a hollow region that is not printed. The character 266 is presented though the light transmissive region 264b by way of configuring the shape of the light transmissive region 264b to correspond to the character 266.

In the second embodiment, the light transmissive region 264b has a plurality of holes 268. The arrangement of the holes 268 may be configured to correspond to the shape of the character 266 to present the character 266. When the light source module 24 provides the light beam to the light guiding member 22, the light beam of the light source module 24 may pass through the plurality of holes 268 of the character sheet 264 such that the character 266 may be presented. The character sheet 264 can be made of leather or fabric for the surface texture and tactile impression of the keyswitch.

In the embodiments of the present invention, the keyswitch assembly and the light guiding member are configured above the outer surface of the key cap such that the effect of uniform illumination on the character is achieved. Since it is not blocked by the body of the keyswitch structure, fewer light-emitting devices are required in the embodiments of the present invention, effectively saving power consumption of the keyswitch assembly.

In addition, the keyswitch assembly is disposed above the outer surface of the key cap through the light guiding member. The character sheet is formed with different materials such that the keyswitch assembly can provide the user with different appearance or tactile experience.

Figure 9:
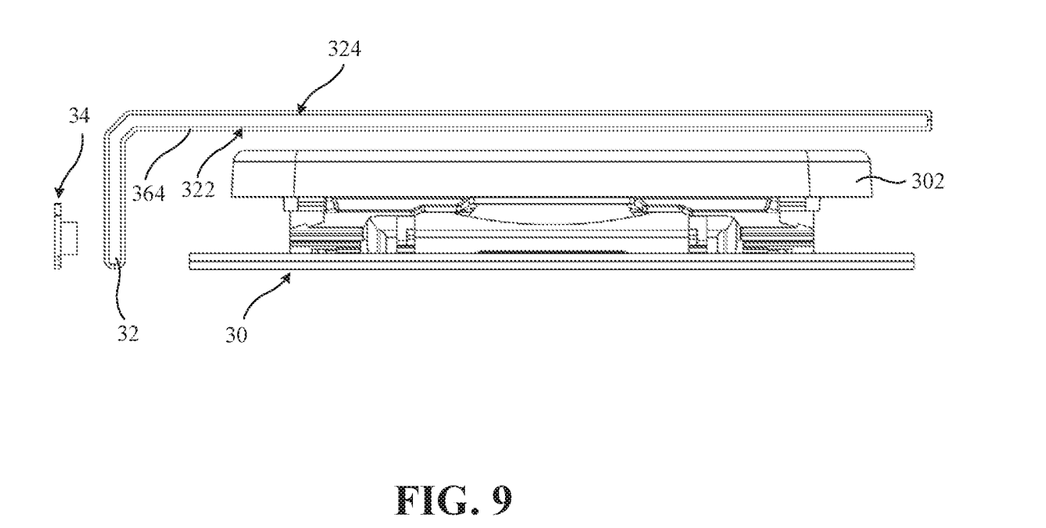
FIG. 9 shows the partial exploded view of the keyswitch assembly according to a third embodiment of the present invention.

FIG. 9 shows the partial exploded view of the keyswitch assembly according to a third embodiment of the present invention. As shown in FIG. 9, the keyswitch assembly of the third embodiment of the present invention comprises a keyswitch module 30, a light guiding member 32, a light source module 34 and a character sheet 364. The keyswitch assembly of the third embodiment is similar as the above embodiments. The difference between the third embodiment and the second embodiment lies in that the character sheet 364 is disposed on the first surface 322 of the light guiding member 32. The first surface 322 is adjacent the key cap 302 and the second surface 324 faces away from the key cap 302 and is opposite the first surface 322.

In the third embodiment, a character is formed on the character sheet 364 and corresponds to the key cap 302. The light guiding member 32 itself is transparent. When the external light source is sufficient, the character on the character sheet 364 disposed on the first surface 322 may be directly seen through the light guiding member 32. In addition, when the external source is insufficient or there is need for use, the character is illuminated by the light beam provides by the light source module 34. Since the character corresponds to the key cap 302, when the user presses or clicks the keyswitch assembly according to the character, the key cap 302 may be directly pressed. Similar as the second embodiment, the character sheet 364 of the third embodiment may also comprises a light shielding region and a light transmission region. The shape of the light transmission region corresponds to the shape of the character, rendered in white on a black background. The light transmission region of the character sheet 364 may also comprises a plurality of holes. The character may be presented by way of arranging the holes arrangement to correspond to the shape of the character. When the light source module 34 provides the light beam to the light guiding member 32, the light beam may pass through the plurality of holes of the character sheet 364 to present the character. In the third embodiment, contrary to configuration of the light shielding region and the light transmission region in the second embodiment, the light shielding region is adapted to correspond to the shape of the character, rendered in white on a black background.

Figure 10:
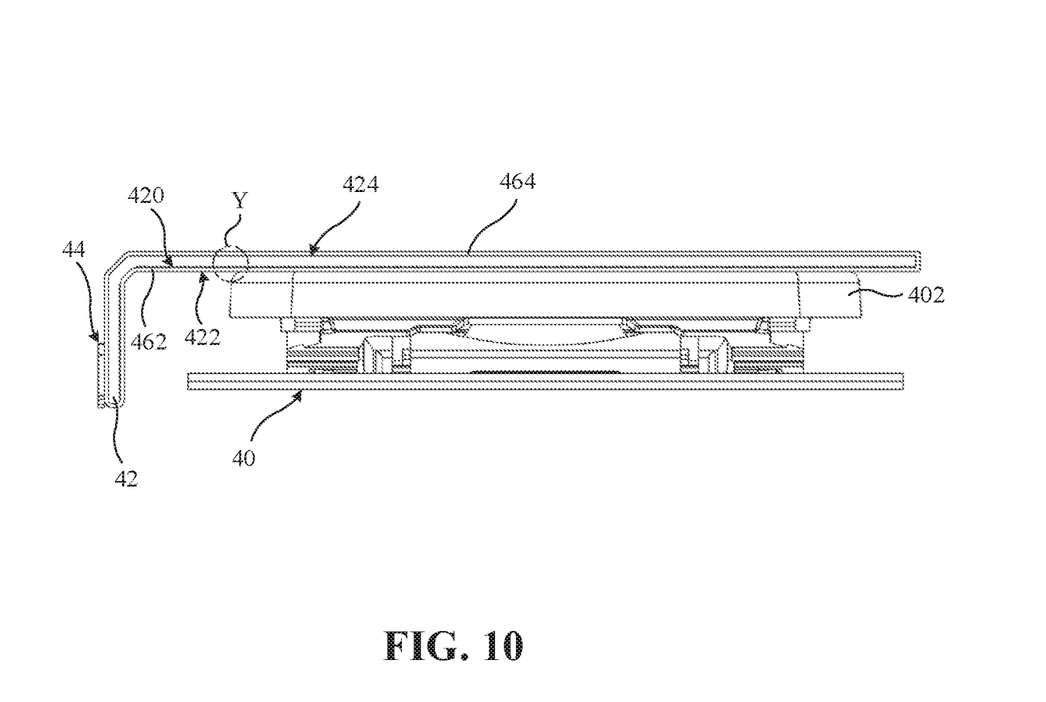
FIG. 10 shows the side view of the keyswitch assembly according to a forth embodiment of the present invention.

FIG. 10 shows the side view of the keyswitch assembly according to a forth embodiment of the present invention. As shown in FIG. 10, the keyswitch assembly of the forth embodiment of the present invention comprises a keyswitch module 40, a light guiding member 42, a light source module 44, a light shielding later 462 and a character sheet 464. The keyswitch assembly of the forth embodiment is similar as the above embodiments. The difference between the forth embodiment and the second embodiment lies in that the light guiding member 42 has a plurality of light diffusing structure. The plurality of diffusing structures is disposed on the first surface 422 of the light guiding member 42. The first surface 422 is adjacent to the key cap 402. The light diffusing structure 420 scatters the light beam provided by the light source module 44, and the light diffusing structure 420 enables the light beam to diffuse more uniformly inside the light guiding member 42 and the character sheet 464 is illuminated from the second surface 424.

Figure 11:
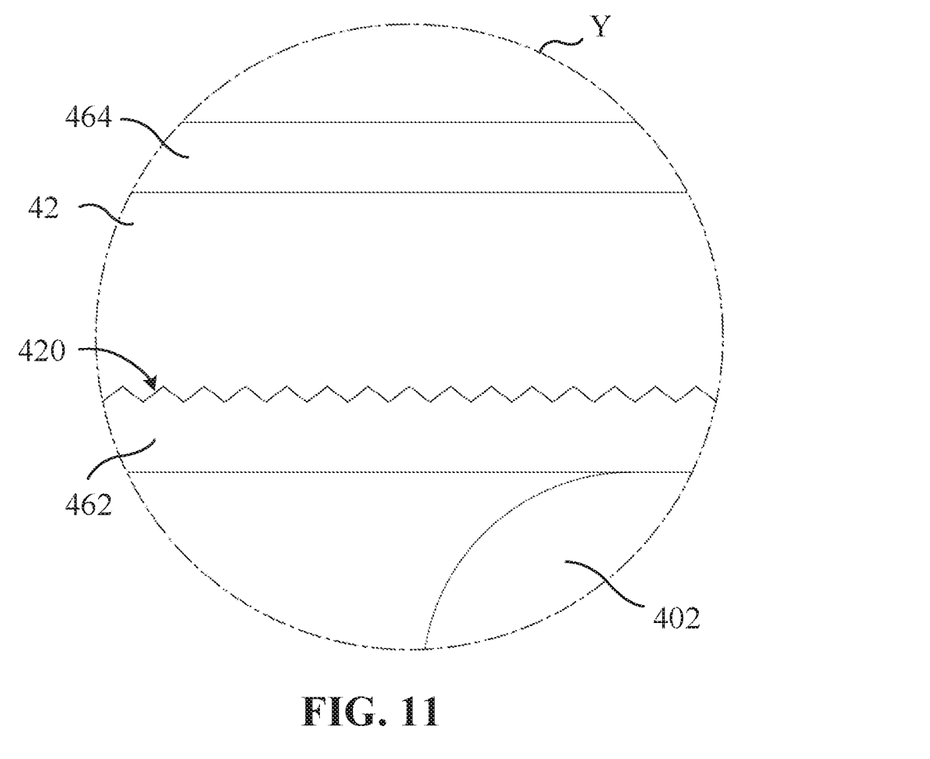
FIG. 11 shows the partial enlarged view of the side view of the keyswitch assembly according to a forth embodiment of the present invention.

FIG. 11 shows the partial enlarged view of the side view of the keyswitch assembly according to a forth embodiment of the present invention. As shown in FIG. 11, the light diffusing structure 420 can be a V-shaped groove structure. The light diffusing structure 420 of the forth embodiment may be, but not limited to, texturing structure or microlens structure. The other components of the keyswitch assembly of the forth embodiment are the same as those of the second embodiment, the description of which is not repeated hereinafter. The plurality of the light diffusing structure 420 may also be applied to the light guiding member of the first embodiment.

In the embodiments of the present invention, the keyswitch assembly is disposed above the outer surface of the key cap through the light guiding member to achieve the uniform illumination on the character. Since it is not blocked by the body of the keyswitch structure, fewer light-emitting devices are required in the embodiments of the present invention, effectively saving power consumption of the keyswitch assembly.

In addition, the light diffusing structure on the light guiding member enables the light source module use a small amount of light source or a lower power light source to achieve the light uniform effect on the entire light guiding member.

Figure 12:
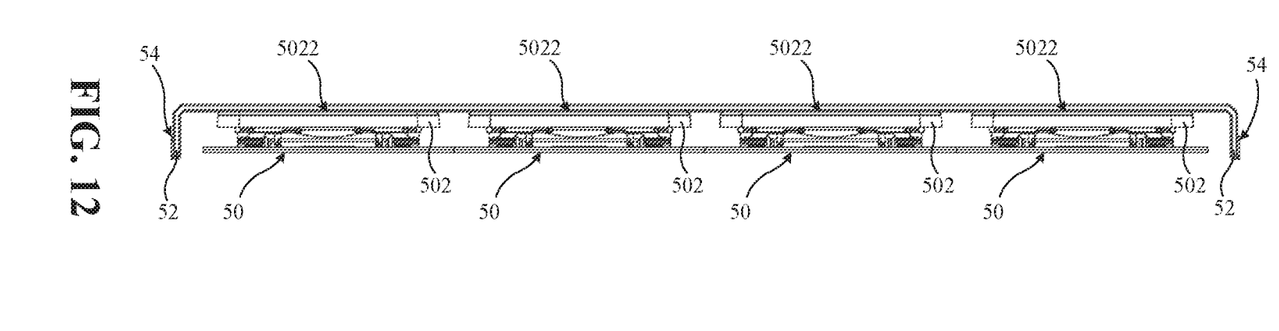
FIG. 12 shows the side view of the keyboard according to a fifth embodiment of the present invention.

FIG. 12 shows the side view of the keyboard according to a fifth embodiment of the present invention. As shown in the figure, the keyboard comprises a plurality of keyswitch modules 50, each having a key cap 502 respectively. The light guiding member 52 is disposed above the outer surfaces 5022 of the key caps 502 of the keyswitch modules 50. The light source module 54 is disposed corresponding to the light guiding member. The light source module 54 provides the light beams incident to the light guiding member 52. The keyswitch module 50 of the fifth embodiment is the same as that of the above embodiments. In the fifth embodiment, the light source module 54 is not limited to be disposed at one side of the plurality of the keyswitch modules 50. In order to achieve the uniform illumination on all the characters for the plurality of the keyswitch modules 50, the light source module 54 may be also disposed at the two sides or the periphery (not shown) of the plurality of the keyswitch modules 50. The light source module 54 may be also disposed between the plurality of keyswitch modules 50 (not shown).

In the embodiment of the present invention, the characters may be sufficiently illuminated for the user by disposing the light guiding member in the keyboard, which brings a new experience for the user to operate the keyboard. The present application also solves the defect that the light-emitting module of the existing keyboard is blocked by the keyswitch structure body to further affect the light-emitting effect.

In addition, the light guiding member disposed above the outer surface of the key cap through the light guiding member may achieve uniform illumination on the characters. Since it is not blocked by the body of the keyswitch structure, fewer light-emitting devices are required in the embodiments of the present invention, effectively saving power consumption of the keyswitch assembly.

It is to be understood that the term "comprises", "comprising", or any other variants thereof, is intended to encompass a non-exclusive inclusion, such that a process, method, article, or device of a series of elements not only includes those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A keyswitch assembly, comprising:
   a keyswitch module having a key cap, a bottom plate, a film circuit board disposed on the bottom plate, a lifting assembly disposed on the bottom plate and corresponding to the film circuit board, and an elastic member disposed in the lifting assembly and corresponds to the film circuit board, wherein the key cap is disposed on the lifting assembly;

a light guiding member disposed above an outer surface of the key cap, the light guiding member having a first surface adjacent to the key cap and a second surface facing away from the key cap and opposite the first surface;

a light source module disposed corresponding to the light guiding member, the light source module providing a light beam incident to the light guiding member; and wherein the light source module is adjacent to the second surface of the light guiding member;

wherein the light guiding member has a main portion and an extending portion extending from a side of the main portion to the bottom plate, and the light source module is disposed corresponding to the extending portion.

2. The keyswitch assembly according to claim 1, wherein the light guiding member further comprises a plurality of light diffusing structures configured on the first surface of the light guiding member, and the light diffusing structure scatters the light beam provided by the light source module.

3. The keyswitch assembly according to claim 2, wherein the light diffusing structure is a texturing structure, a V-shaped groove structure or a microlens structure.

4. The keyswitch assembly according to claim 1, wherein the keyswitch assembly comprises a light shielding sheet disposed on the first surface of the light guiding member.

5. The keyswitch assembly according to claim 4, wherein the light shielding sheet is a reflective sheet.

6. The keyswitch assembly according to claim 1, wherein the keyswitch assembly further comprises a character sheet disposed on the second surface of the light guiding member, and the character sheet comprising a character corresponding to the key cap.

7. The keyswitch assembly according to claim 6, wherein the character sheet comprises a light shielding region and a light transmission region having a shape corresponding to the shape of the character.

8. The keyswitch assembly according to claim 7, wherein the light transmission region comprises a plurality of holes.

9. The keyswitch assembly according to claim 1, wherein the keyswitch assembly further comprises a character sheet disposed above the outer surface of the key cap, the character sheet comprising a character.

10. The keyswitch assembly according to claim 1, wherein the keyswitch assembly further comprises a character sheet disposed on the first surface of the light guiding member, the character sheet comprising a character corresponding to the key cap.

11. The keyswitch assembly according to claim 10, wherein the character sheet comprises a light shielding region and a light transmission region having a shape corresponding to the shape of the character.

12. The keyswitch assembly according to claim 10, wherein the character sheet comprises a light transmission region and a light shielding region having a shape corresponding to the shape of the character.

13. A keyboard, comprising:
a plurality of keyswitch modules, each having a key cap, a bottom plate, a film circuit board disposed on the bottom plate, a lifting assembly disposed on the bottom plate and corresponding to the film circuit board, and an elastic member disposed in the lifting assembly and corresponds to the film circuit board, wherein the key cap is disposed on the lifting assembly;

a light guiding member disposed above an outer surface of the key cap; and a light source module disposed corresponding to the light guiding member, the light source module providing a light beam incident to the light guiding member;

wherein the light source module is adjacent to the second surface of the light guiding member; and wherein the light guiding member has a main portion and an extending portion extending from a side of the main portion to the bottom plate, and the light source module is disposed corresponding to the extending portion.

* * * * *